United States Patent [19]

Caraway, deceased et al.

[11] 4,212,654
[45] Jul. 15, 1980

[54] CENTRIFUGAL WET GAS SCRUBBING METHOD AND APPARATUS

[76] Inventors: Guy C. Caraway, deceased, late of Downey, Calif.; by Virginia M. Caraway, executrix, 9703 Wiley Burke Ave., Downey, Calif. 90240

[21] Appl. No.: 927,415

[22] Filed: Jul. 24, 1978

Related U.S. Application Data

[63] Continuation of Ser. No. 786,105, Apr. 11, 1977, abandoned.

[51] Int. Cl.² .............................................. B01D 47/06
[52] U.S. Cl. .................................. 55/91; 55/257 C; 55/400; 261/17; 261/89; 261/116
[58] Field of Search ................... 55/23, 82, 83, 90–92, 55/257 R, 400, 405–407; 261/17, 89, 116

[56] References Cited

U.S. PATENT DOCUMENTS

| | | | |
|---|---|---|---|
| 404,606 | 6/1889 | DeBrouwer | 261/89 |
| 888,090 | 5/1908 | Kestner | 261/89 |
| 900,062 | 9/1908 | Ernst | 55/91 X |
| 991,157 | 5/1911 | Kestner | 55/91 |
| 1,008,601 | 11/1911 | Keller | 261/89 X |
| 1,563,125 | 11/1925 | Ward | 55/83 X |
| 2,579,282 | 12/1951 | Vicard | 55/90 X |
| 3,853,515 | 12/1974 | Davis | 261/90 X |
| 4,067,703 | 1/1978 | Dullien et al. | 55/400 X |

FOREIGN PATENT DOCUMENTS 13930 of 1915 United Kingdom ..................... 55/406

*Primary Examiner*—Kathleen J. Prunner
*Attorney, Agent, or Firm*—Harris, Kern, Wallen & Tinsley

[57] ABSTRACT

A gas scrubbing method and apparatus involving uniformly saturating the gas to be scrubbed with water, i.e., wetting the gas to be scrubbed with water vapor to a relative humidity of substantially 100%, and then centrifugally compressing the wetted gas by many atmospheres, i.e., to a density many times atmospheric, to condense and extract from the wetted gas at least part of the water vapor therein, and particulate and gaseous contaminants contacted by the water vapor.

7 Claims, 3 Drawing Figures

CENTRIFUGAL WET GAS SCRUBBING METHOD AND APPARATUS

This is a continuation of application Ser. No. 786,105, filed Apr. 11, 1977, now abandoned.

BACKGROUND OF INVENTION

The present invention relates in general to the gas scrubbing art, and more particularly, to a method of and apparatus for centrifugally scrubbing a gas which has been wetted for water.

SUMMARY AND OBJECTS OF INVENTION

The invention may be summarized as comprising, and the primary object of the invention is to provide a method and apparatus which comprise, wetting the gas to be scrubbed with water vapor until the gas is at least substantially saturated, i.e., until the relative humidity of the gas reaches at least nearly 100%, and then centrifugally compressing the wetted gas sufficiently to condense and extract from the gas at least part of the water vapor therein, and, more particularly, substantially all of the particulate and gaseous contaminants contacted by the water vapor.

The invention may be further summarized as including, and another important object is to provide a method and apparatus which include, centrifugally compressing the wetted gas to a density of the order of at least three times atmospheric, and preferably many times atmospheric. More particularly, the wetted gas is preferably centrifugally compressed sufficiently to increase its density by a factor of from twenty to fifty, or more.

Viewing the invention a little differently, it requires as an essential first step, uniformly saturating the gas to be scrubbed with water vapor to a relative humidity of substantially 100%. This may be effected by injection of steam and/or the injection of atomized water, the latter being vaporized by the waste heat energy in the flue gas being scrubbed. In either event, sufficient water is introduced to obtain substantially complete saturation, the amount required being dependent upon the quantity of gas to be scrubbed, the temperature of the gas, and the like.

Wetting the gas with water vapor to a relative humidity of at least nearly 100% achieves maximum absorption of particulate and gaseous contaminants, as compared to a gas containing dispersed water droplets with dry, or relatively dry, gas therebetween. Essentially, the invention, by wetting the gas to be scrubbed with water vapor to a relative humidity of at least nearly 100%, generates a fog of microscopic water droplets which approach the molecular level in size and which are so closely spaced throughout and mixed with the gas that they are capable, particularly upon subsequent compression, of absorbing substantially all particulate contaminants, and substantially all gaseous contaminants which are water soluble at the molecular level, i.e., which are water soluble when the molecules thereof are intimately mixed with water molecules.

The second essential step involved in the present invention is centrifugally compressing the wetted gas to a density many times atmospheric to condense and extract therefrom at least part of the water vapor and high percentages of those contaminants which are contracted by the water vapor. The centrifugal compression of the wetted gas greatly enhances the absorption of particulate contaminants and gaseous contaminants which are water soluble at the molecular level, by bringing the particulate contaminants, the molecules of water vapor, and the molecules of such gaseous contaminants into much closer proximity. This greatly increases the incidence of collision between such molecules, and thus greatly increases the absorption of the contaminants mentioned by the microscopic water droplets. The centrifugal compression also has the effect of condensing the water vapor, and the particulate and gaseous contaminants absorbed thereby, so that the condensed water vapor can be extracted from the gas to achieve the desired scrubbing effect. In other words, the centrifugal forces compress the fog mixture into condensed water, which can be extracted from the gas and drained away, along with the particulate and gaseous contaminants absorbed thereby.

Tests have shown that the present invention removes substantially all particulate contaminants from flue gas, including such things as the smoke, soot, fly ash, and the like, associated with coal combustion. Other tests have shown that the invention is very effective in scrubbing gaseous contaminants from flue gas, an example being at least 95% removal of sulfur dioxide, which is an important feature since it permits the use of fuels with high sulfur contents with substantially no atmospheric pollution from this source.

Considering other aspects of the invention, as previously indicated, an important feature is to utilize waste heat energy wherever possible. Consequently, if waste steam is available, it can be utilized to at least partially wet the gas to be scrubbed with water vapor. Alternatively, or in addition, atomized water is injected into the gas to be scrubbed in a quantity sufficient to achieve a relative humidity of substantially 100%, utilizing the waste heat energy in the gas to achieve vaporization of the atomized water.

Another important feature of the present invention is that it achieves highly efficient removal of particulate contaminants and gaseous contaminants which are water soluble at the molecular level, such as sulfur dioxide, with plain water, without additives. However, in some instances, additives may be used to scrub contaminants which cannot be removed with plain water alone.

Considering still other aspects of the invention, it may be further summarized as including, and another important object is to provide a gas scrubbing installation which includes, a centrifuge means comprising a rotor having a central axial inlet and having circumferentially spaced, outwardly extending outlets around its periphery, the diameter of the rotor, its rotational speed, and the areas of the outlets being so selected that, for a given flue gas, contaminant and water vapor mixture, the mixture is compressed to a density of the order of three or more times atmospheric, and peferably to a density corresponding to twenty to fifty atmospheres, no more.

Another object is to provide a rotor mounted at the top of a substantially vertical stack for flue gas in substantially coaxial relation with the stack, and with its central axial inlet in communication with the stack.

An important object is to provide a rotor which converges in the radially outward direction to progressively reduce the radial cross-sectional area of the interior of the rotor in the radially outward direction. This construction has the effect of increasing the effect of centrifugal compression, other factors being equal. Another object is to incline the circumferentially spaced, peripheral outlets rearwardly of the direction of rotor rotation so that the gas and water ejected through the outlets assists in driving the rotor, thereby reducing the power required by the rotor driving means, which may be an electric motor.

Another object is to provide two radially-outwardly-converging annular screens in and carried by the rotor and a third annular screen in and carried by the rotor between the first two. These screens, which may be of expanded metal, reduce slippage between the rotor and the mixture flowing radially outwardly through the rotor. A related object is to provide circumferentially spaced impeller blades in and carried by the rotor and coaxial with the axial inlet for further imparting rotational movement to the mixture flowing radially outwardly through the rotor.

Merely as an example, utilizing a rotor of the foregoing nature having a diameter of 24 inches driven at 3,600 r.p.m., with an area ratio between the axial inlet and the outlets at 20:1, achieves centrifugal compression of the wetted gas to a density of the order of about forty-five times atmospheric. However, very good scrubbing can be achieved with lower compressions, e.g., in the range of twenty-five to thirty times atmospheric density.

The foregoing objects, advantages, features and results of the present invention, together with various other objects, advantages, features and results which will be evident to those skilled in the centrifugal, wet gas scrubbing art in the light of this disclosure, may be achieved with the exemplary embodiment of the invention illustrated in the accompanying drawings and described in detail hereinafter.

DESCRIPTION OF EXEMPLARY EMBODIMENT OF INVENTION

Figure 1:
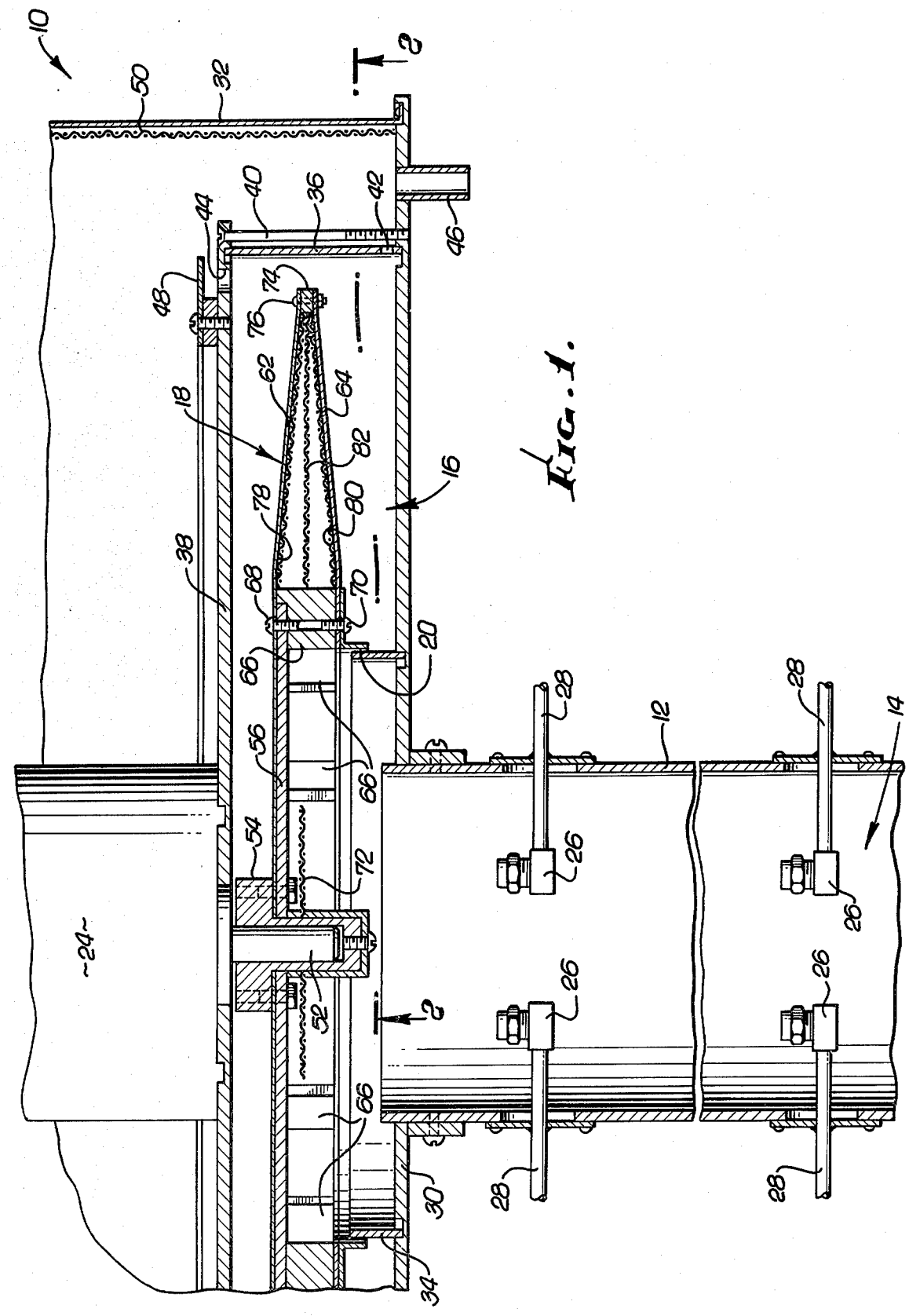
FIG. 1 is a fragmentary vertical sectional view of a centrifugal, wet gas scrubbing apparatus which embodies the invention and which is capable of performing the method thereof.

In the drawings, the gas scrubbing installation of the invention is designated generally by the numeral 10 and includes a substantially vertical stack 12 for flue gas to be scrubbed, means 14 for wetting the gas rising in the stack with water vapor to a relative humidity of substantially 100%, and centrifuge means 16 at the top of the stack for centrifugally compressing the wetted gas to a density of the order of three or more times, and preferably twenty to fifty, or more, times, atmospheric to condense and extract from the wetted gas at least part of the water vapor and contaminants contacted by the water vapor. More particularly, the centrifuge means includes a rotor 18 substantially coaxial with the stack 12 and having a central axial inlet 20 in communication with the stack, the rotor being provided with circumferentially spaced, outwardly extending outlets 22, FIG. 2, around its periphery. An electric motor 24, or other suitable means, drives the rotor 18.

As hereinbefore discussed, the wetting means uniformly saturates the flue gas rising in the stack 12 with water vapor to a relative humidity of nearly 100%. This may be effected by injection of steam and/or the injection of atomized water, the latter being vaporized by the waste heat energy in the flue gas being scrubbed. In either event, sufficient water is introduced to obtain substantially complete saturation, the amount required being dependent upon the quantity of flue gas to be scrubbed, the temperature of the gas, and the like.

In the particular construction illustrated, the wetting means 14 comprises water atomizing jets 26 spaced apart vertically of the stack 12 and supported by and supplied with water by pipes 28. The latter are connected to a suitable water-input control system, not shown.

The centrifuge means 16 is housed in a cylindrical tank which includes a bottom wall 30 suitably supported by the stack 12 and a cylindrical outer housing 32 with an open top. The bottom wall 30 carries an air seal ring 34 which extends upwardly into the central axial inlet 20 of the rotor 18. A cylindrical spacer 36 seated on the bottom wall 30 supports a circular upper wall 38 which is secured to the bottom wall by circumferentially spaced screws 40.

Water and gas discharged by the rotor 18 into the space defined by the bottom wall 30, the spacer 36 and the upper wall 38 escape through openings 42 in the spacer and openings 44 in the upper wall. The bottom wall 30 is provided externally of the spacer 36 with a main drain 46. Carried by the upper wall 38 and spaced upwardly therefrom above the openings 44 is an annular deflector 48 which directs gas and entrained water escaping through the openings 44 outwardly against the outer housing 32. The latter is lined internally thereof with a screen 50 which tends to collect water impinging thereon and cause it to drain downwardly to the bottom wall 30.

If desired, the annular spacer 36 may be omitted in favor of a circumferentially discontinuous spacing means which permits the water discharged by the rotor 18 to impinge directly on the screen 50 lining the outer housing 32.

The motor 24 is suitably mounted on the upper wall 38 with its axis substantially vertical and coaxial with the stack 12, the output shaft 52 of the motor depending below the upper wall 38. Suitably secured to the output shaft 52 is a bushing 54 which carries and drives the rotor 18. More particularly, the rotor 18 includes an annular upper supporting plate 56 which carries the other components of the rotor as will be described.

Figure 2:
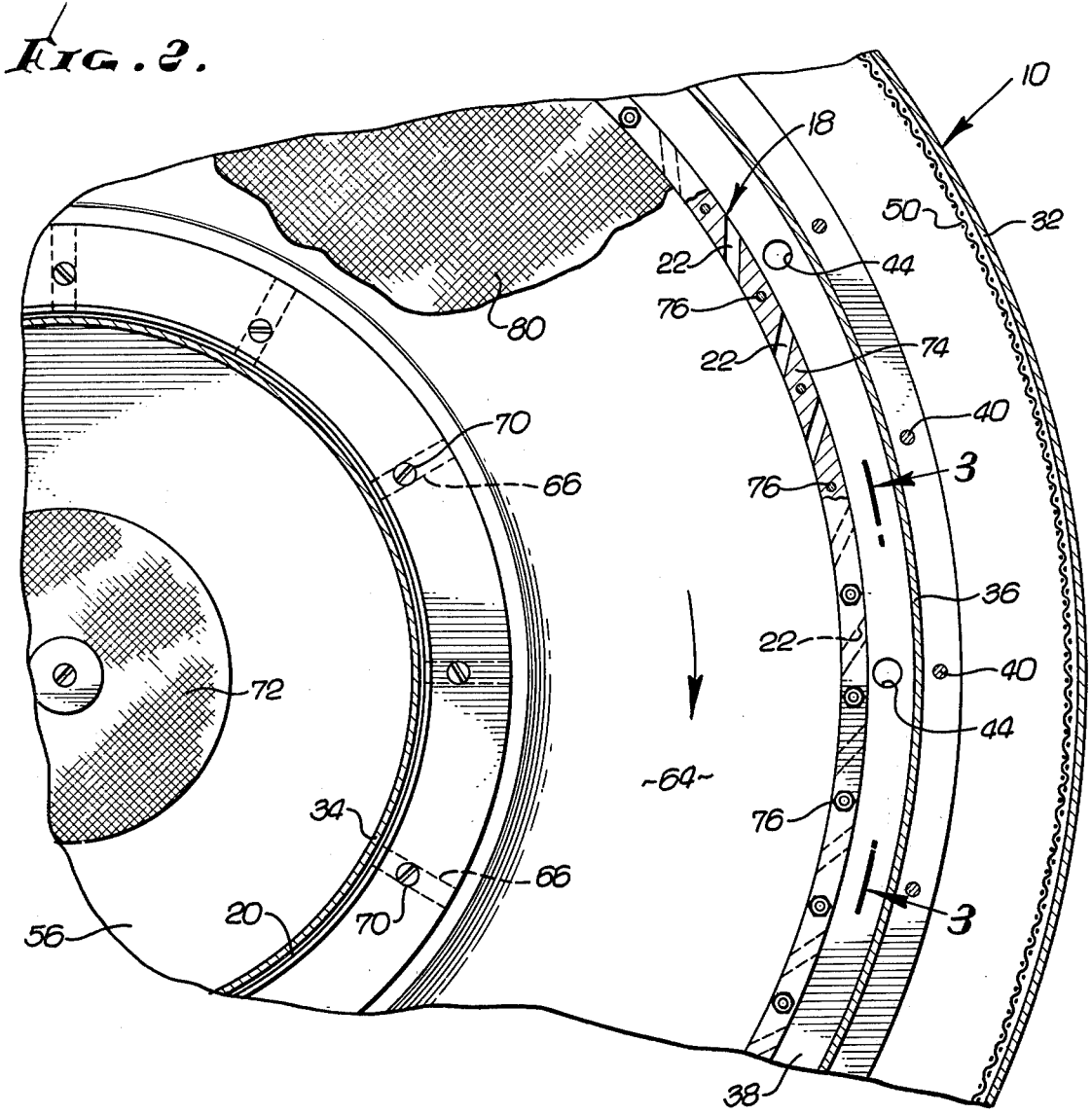
FIG 2 is a fragmentary sectional view taken as indicated by the arrowed line 2—2 of FIG. 1.
Figure 3:
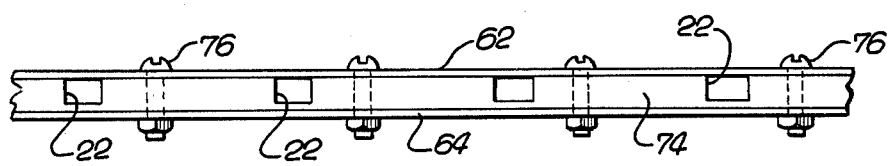
FIG. 3 is a fragmentary sectional view taken as indicated by the arrowed line 3—3 of FIG. 2.

More particularly, the rotor 18 converges in the radially outward direction, as best shown in FIG. 1, which has the effect of increasing the extent of centrifugal compression of the mixture of flue gas, water vapor and contaminants, other factors being equal. The circumferentially spaced, peripheral outlets 22, as shown in FIG. 2, are inclined rearwardly of the direction of rotation of the rotor 18 so that the mixture ejected through the outlets assists in driving the rotor, thereby reducing the power required by the motor 24. As previously pointed out, the rotor 18 may have a ratio between the area of the axial inlet 20 and the total of the areas of the outlets 22 which is of the order of 20:1.

Considering the construction of the rotor 18 as shown in more detail, it includes an upper annular sheet 62 which is clamped against the bushing 54 by the supporting plate 56 and which extends radially outwardly beyond this supporting plate. The rotor 18 also includes a lower annular sheet 64 the inner periphery of which coincides with the central axial inlet 20. The inner periphery of the lower annular sheet 64 is spaced downwardly from the upper annular sheet 62 by a circumferential array of radial spacers 66. Screws 68 secure the spacers 66 to the upper annular sheet 62 and the supporting plate 56. Screws 70 secure the central axial inlet 20 and the lower annular sheet 64 to the spacers 66. The latter act as impeller blades which tend to assist in displacing the mixture of flue gas, water vapor and contaminants radially outwardly toward the outer periphery of the interior of the rotor 18. An annular slinger screen 72 carried by the bushing 54 also assists in propelling any water droplets radially outwardly.

The upper and lower annular sheets 62 and 64 converge radially outwardly to and are clamped against an annular spacing ring 74 therebetween, as by bolts 76. The outlets 22 are formed by grooves in one surface of the ring 74, which grooves are inclined so as to be oriented tangentially rearwardly of the direction of rotor rotation.

Suitably secured in the outer annular portion of the rotor 18 are two radially-outwardly-converging annular screens 78 and 80 and a third annular screen 82 between the first two, these screens being carried by and rotatable with the rotor. The screens 78, 80 and 82, which may, for example, be of expanded metal, reduce slippage between the rotor 18 and the mixture flowing radially outwardly therethrough, assisting the vane-like spacers 66 in this respect.

It is thought that the operation of the gas scrubbing installation 10 of the invention will be apparent, in view of what has been said earlier herein, with only a brief summation. More particularly, the flue gas is substantially uniformly wetted with water vapor to a relative humidity of nearly 100% as it flows upwardly through the stack 12 and/or enters the rotor 18. Within the rotor, the mixture of flue gas, water vapor and contaminants is centrifugally compressed to a density many times atmospheric so as to condense at least part of the water vapor and contaminants contacted thereby. The resulting contaminant-laden water is collected by the spacer 36 and/or the outer housing 32 and ultimately escapes through the main drain 46.

Although an exemplary embodiment of the invention has been disclosed for illustrating purposes, it will be understood that various changes, modifications and substitutions may be incorporated in such embodiment without departing from the invention as hereinafter claimed.

I claim as my invention:

1. A gas scrubbing method, including the steps of:
   (a) uniformly wetting the gas to be scrubbed with water vapor to a relative humidity of substantially 100%; and
   (b) centrifugally compressing the wetted gas in an enclosed rotating structure, including impinging the water vapor on a screen in the rotating structure, to a density many times atmospheric to condense and extract therefrom at least part of the water vapor and contaminants in the gas which are contacted by the water vapor.

2. In a gas scrubbing installation, the combination of:
   (a) a substantially vertical stack for flue gas to be scrubbed;
   (b) means for wetting flue gas to be scrubbed rising in the stack with water vapor to a relative humidity of substantially 100%; and
   (c) centrifuge means at the top of and mounted on and communicating with the stack for centrifugally compressing the wetted gas to a density many times atmospheric to condense and extract therefrom at least part of the water vapor and contaminants in the gas which are contacted by the water vapor,
   (d) said centrifuge means including a rotor mounted on and having a central axial inlet in communication with said stack, and
   (e) means for rotating said rotor,
   (f) said rotor having upper and lower surfaces and outwardly extending outlets around its periphery, and
   (g) at least one annular screen carried within said rotor between said inlet and said outlet.

3. A gas scrubbing installation according to claim 8 wherein said upper and lower surfaces of said rotor converge in the radially outward direction.

4. A gas scrubbing installation as set forth in claim 3 wherein said outlets are inclined circumferentially rearwardly of the direction of rotor rotation.

5. A gas scrubbing installation as defined in claim 11 including two radially-outwardly-converging annular screens in and carried by said rotor between said upper and lower surfaces and a third annular screen in and carried by said rotor between and bisecting the space between the first two.

6. A gas scrubbing installation according to claim 5 including circumferentially spaced impeller blades in and carried by said rotor and coaxial with said axial inlet.

7. A gas scrubbing installation as defined in claim 2 wherein said wetting means comprises water atomizing jets within said stack.

* * * * *

UNITED STATES PATENT AND TRADEMARK OFFICE
CERTIFICATE OF CORRECTION

PATENT NO. : 4,212,654

DATED : July 15, 1980

INVENTOR(S) : GUY C. CARAWAY, Deceased et al.

It is certified that error appears in the above-identified patent and that said Letters Patent are hereby corrected as shown below:

Claim 3, column 6, line 33 - "8" should be --2--

Claim 5, column 6, line 39 - "11" should be --3--

Signed and Sealed this

First Day of September 1981

[SEAL]

Attest:

Attesting Officer

GERALD J. MOSSINGHOFF

Commissioner of Patents and Trademarks